Figures 1, 2:
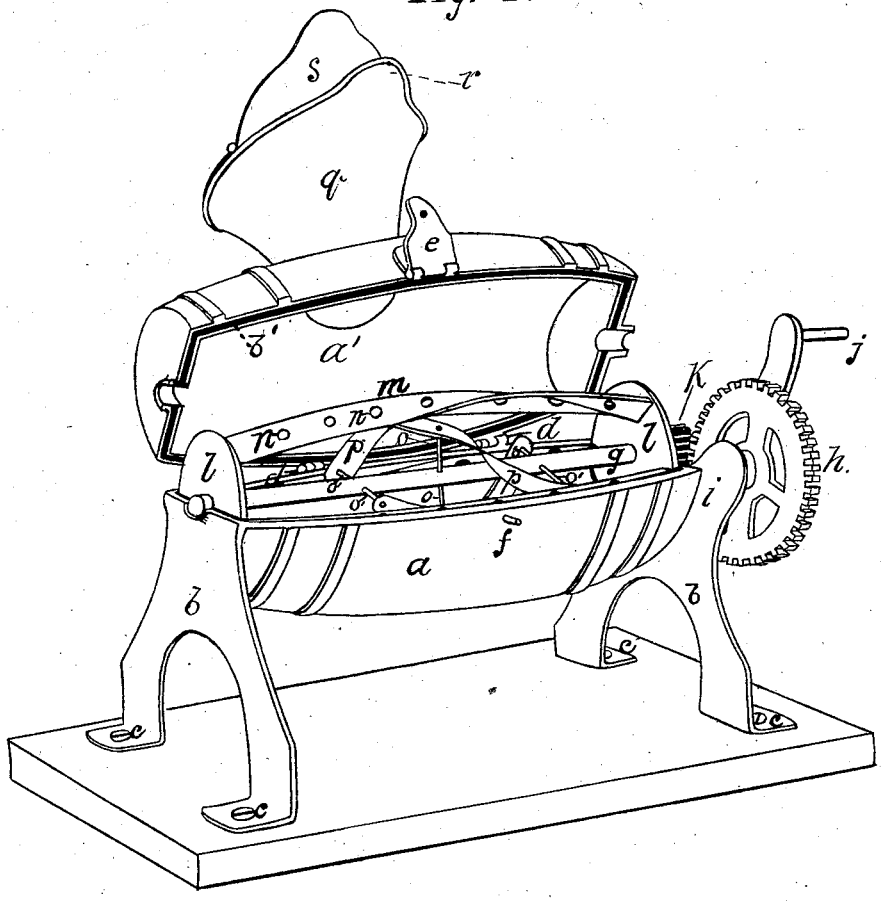

(No Model.)

G. B. FOWLER.
EGG BEATER AND MIXER.

No. 256,310. Patented Apr. 11, 1882.

WITNESSES:
C. F. Post
E. M. Smith

INVENTOR
George B. Fowler

UNITED STATES PATENT OFFICE.

GEORGE B. FOWLER, OF BROOKLYN, NEW YORK.

EGG BEATER AND MIXER.

SPECIFICATION forming part of Letters Patent No. 256,310, dated April 11, 1882.

Application filed September 20, 1881. (No model.)

*To all whom it may concern:*

Be it known that I, GEORGE B. FOWLER, a citizen of the United States, residing at Brooklyn, in the county of Kings and State of New York, have invented certain new and useful Improvements in Egg-Beaters, of which the following is a specification.

My invention relates to improvements in egg-beaters in which the mechanism for agitating or beating the eggs is contained and operated within the receptacle for holding the eggs; and the main objects of my improvements are, first, to provide a vessel of such peculiar shape and so adapt the stirring device thereto that one egg or a small quantity can be as thoroughly and quickly beaten as a large quantity; second, to afford facilities for the ready removal of the stirring mechanism and cleansing of the vessel; and, third, to provide a peculiar construction and arrangement of the operating mechanism, as will be more fully hereinafter set forth.

In the accompanying drawings, which serve to illustrate my invention, Figure 1 is a perspective view of my improved egg-beater, the upper part of the vessel being shown partly thrown back, and Fig. 2 is a fragmentary view enlarged, showing the rubber inserted in the upper portion.

$a$ represents the receptacle for holding the eggs and within which they are beaten. It is preferably made of light metal, of barrel-shape form, and is mounted on legs $b\ b$, which may be secured to a table or other support by bolts or pins passing through the flange $c$. The receptacle $a$ is divided into two parts or sections, $a\ a'$, each of concavo-convex form, which are hinged together, as shown at $d\ d$. The upper section, which serves as a cover, is shown in Fig. 1 as partly thrown back in order to expose the beating mechanism arranged therein. A catch, $e$, provided on the upper section and adapted to clasp pin $f$ on the lower section, serves to secure the two together when closed.

$g$ is a horizontal shaft extending through the vessel $a$, having its bearings in the ends thereof. A toothed wheel, $h$, is mounted on a short rod or shaft projecting from the leg-frame $i$, to which rod or shaft is likewise attached the crank $j$. A pinion, $k$, secured to the shaft $g$, gears into wheel $h$ and serves as the driving mechanism. Within and in close contact with the ends of the vessel $a$ are secured to the shaft $g$ disk-plates $l\ l$. To the periphery of these disk-plates are attached four or more flat bars or blades, $m$, which are provided with holes or perforations $n\ n$. These bars or blades have but one gradual twist, so that a cutting-edge on different planes is presented on their entire length. They have a convex form, to adapt them to the contour of the vessel, so that as they are rotated they nearly touch every part of the inner periphery of the vessel. By this construction and arrangement of the beaters and vessel it is possible to as thoroughly and quickly beat a very small quantity as a larger mass of eggs.

$o\ o$ are short radial bars projecting at right angles to each other from the shaft $g$, to which are secured the central twisted bars or blades $p\ p$. Each end of these blades is attached to a rod, $o'$, on the same plane, while the center is secured to a rod at right angles to the end rods, thereby giving a reverse inclination to the blades and enabling them to cut or stir the mass irregularly.

The top of the vessel is provided with a funnel-shaped receiver, $q$, having spout $r$ and hinged cover $s$. Through this the eggs or other matter to be beaten is delivered to the vessel.

The operation of the device is as follows: The desired number of eggs being broken into the receiver $q$, the contents will flow into the vessel $a$. By rotating the crank $j$ motion is imparted to the shaft $g$ through the wheel and pinion, and the beating-blades are rapidly revolved, cutting and agitating every part of the mass until it is brought to the proper condition of lightness.

In order to prevent the possibility of the escape of any of the contents of the vessel during the process of beating through the joint formed by the union of two sections, I provide a strip of rubber, $b'$, around the edge of the upper section or cover. It is inserted in a small wedge-shaped groove formed around the edge, as is shown at $t$ in Fig. 2. This insures a perfectly tight joint when the two parts of the vessel are shut together.

When it is desirable to cleanse the vessel and beating mechanism the shaft $g$ with its attached parts is easily lifted from its bearings, when the whole interior of the vessel is left exposed and open for cleaning.

While my device is more especially designed for beating eggs, it is equally well adapted to all purposes where several ingredients are to be mixed together or amalgamated by rapid agitation.

What I claim as new, and desire to secure by Letters Patent, is—

1. In an egg-beater, the combination, with the beating mechanism, of a vessel composed of two barrel-shaped sections hinged together, and having bearings for a central shaft formed in their meeting edges, substantially as set forth.

2. In an egg-beater, the combination, with a vessel consisting of two concavo-convex sections hinged together, of a shaft having its bearings in the ends of said vessel, and provided with disk-plates for supporting the beating-blades and with mechanism for driving said shaft, substantially as set forth.

3. The combination of the vessel $a$, rotary shaft $g$, disk-plates $l$, and beating or stirring blades $m$, attached to the periphery of said disk-plates, all arranged and operated in the manner set forth.

4. The combination, with the concavo-convex vessel $a$, and driving-shaft $g$, having disk-plates $l$ secured thereto, of the correspondingly-shaped twisted and perforated beating-blades $m$, substantially as and for the purpose set forth.

5. The combination, with an egg-beater having the beating mechanism arranged within the egg-holding vessel, of a driving-shaft provided with radial arms set at right angles thereto and to each other, and with twisted bars or blades secured to said arms in a spiral manner, substantially as herein shown and described.

6. In combination with the vessel $a$, the funnel-shaped receiver $q$, provided with a spout, $r$, and hinged cover $s$, substantially as set forth.

7. In an egg-beater, the stirring and beating device herein described, composed of perforated bars or blades secured to disk-plates arranged on the driving-shaft, and shorter spiral bars arranged on arms projecting from said shaft and inclosed by the perforated bars, substantially as set forth.

8. An egg-beater consisting of a vessel hinged together in two equal sections, the upper section being provided with a strip of rubber or other equivalent material, whereby a close joint is formed when the said sections are shut together, substantially as set forth.

GEORGE B. FOWLER.

Witnesses:
HENRY E. COE,
KATE NEWELL.